(12) United States Patent
Chien et al.

(10) Patent No.: US 6,983,130 B2
(45) Date of Patent: Jan. 3, 2006

(54) WATERPROOF STRUCTURE OF HANDHELD ELECTRONIC DEVICE

(75) Inventors: Shen Yuan Chien, Hsin-Tien (TW); Ming Che Chan, Hsin-Tien (TW)

(73) Assignee: Unitech Electronics Co., Ltd., Taipei Hsien (TW)

( * ) Notice: Subject to any disclaimer, the term of this patent is extended or adjusted under 35 U.S.C. 154(b) by 591 days.

(21) Appl. No.: 10/292,425

(22) Filed: Nov. 13, 2002

(65) Prior Publication Data

US 2004/0089570 A1 May 13, 2004

(51) Int. Cl.
H04B 1/38 (2006.01)
H04M 1/00 (2006.01)

(52) U.S. Cl. ............... 455/90.3; 405/575.1; 405/575.8; 379/433.01

(58) Field of Classification Search ............... 455/90.3, 455/575.1, 575.8; 379/433.01; 396/25–29
See application file for complete search history.

(56) References Cited

U.S. PATENT DOCUMENTS

| | | | |
|---|---|---|---|
| 4,225,970 A * | 9/1980 | Jaramillo et al. .......... 455/90.3 |
| 5,386,084 A * | 1/1995 | Risko ........................ 174/52.3 |
| 5,526,526 A * | 6/1996 | Clark et al. ................ 455/90.3 |
| 6,078,792 A * | 6/2000 | Phillips .................... 455/575.1 |
| 6,466,741 B2 * | 10/2002 | Uchiyama ..................... 396/6 |
| 2003/0095374 A1 * | 5/2003 | Richardson ................. 361/681 |

* cited by examiner

Primary Examiner—Nick Corsaro
Assistant Examiner—Yuwen Pan
(74) Attorney, Agent, or Firm—Rosenberg, Klein & Lee

(57) ABSTRACT

A housing of a handheld electronic device includes a front and a rear shell, a bottom cover, a cover body, and a battery cover. A bearing portion and a battery receiving room are formed above and below the backside of the rear shell. A waterproof structure comprises a main body gasket, a cover body gasket, and a battery cover gasket. The top and bottom ends of the main body gasket are connected to a top gasket and a bottom cover gasket. The main body gasket and the top gasket are embedded at the adjoining profile and the topside between the front and rear shells. The bottom cover gasket is embedded between the bottom side of the housing and the bottom cover. The cover body gasket is embedded between the cover body and the bearing portion. The battery cover gasket is embedded between the battery receiving room and the battery cover.

8 Claims, 4 Drawing Sheets

WATERPROOF STRUCTURE OF HANDHELD ELECTRONIC DEVICE

FIELD OF THE INVENTION

The present invention relates to a waterproof structure of a handheld electronic device and, more particularly, to a waterproof structure letting a handheld electronic device like a handheld computer, a personal digital assistant (PDA), or a store price scanner have the waterproof effect.

BACKGROUND OF THE INVENTION

Handheld electronic devices include handheld computers, PDAs, and store price scanners. When these conventional handheld electronic devices are used in damp and low-temperature environments, water or moisture may easily permeate into the devices because there is no waterproof structure or any structure for preventing permeation of water or moisture, resulting in short circuit or malfunction of the circuit.

Accordingly, the present invention aims to provide a waterproof structure of a handheld electronic device to resolve the problems in the prior art.

SUMMARY OF THE INVENTION

The primary object of the present invention is to provide a waterproof structure of a handheld electronic device to effectively prevent the handheld electronic device from short circuit or malfunction due to permeation of water or moisture. Moreover, better simplicity and convenience can be accomplished in assembly.

Another object of the present invention is to provide a waterproof structure of a handheld electronic device to have firmly positioning effect.

To achieve the above objects, the present invention provides a waterproof structure of a handheld electronic device. A housing of the handheld electronic device comprises a front shell, a rear shell, a bottom cover, a cover body, and a battery cover. A bearing portion and a battery receiving room are formed above and below the backside of the rear shell, respectively. The waterproof structure comprises a main body gasket, a cover body gasket, and a battery cover gasket. The shape of the main body gasket depends on the adjoining profile between the front and rear shells. The top and bottom ends of the main body gasket are connected to a top gasket and a bottom cover gasket, respectively. The main body gasket and the top gasket are embedded the adjoining profile and the topside between the front and rear shells, respectively. The bottom cover gasket is embedded between the bottom side of the housing and the bottom cover. The cover body gasket is embedded between the cover body and the bearing portion of the rear shell. The battery cover gasket is embedded between the battery receiving room and the battery cover.

The various objects and advantages of the present invention will be more readily understood from the following detailed description when read in conjunction with the appended drawing, in which:

DETAILED DESCRIPTION OF THE PREFERRED EMBODIMENTS

Figure 1:
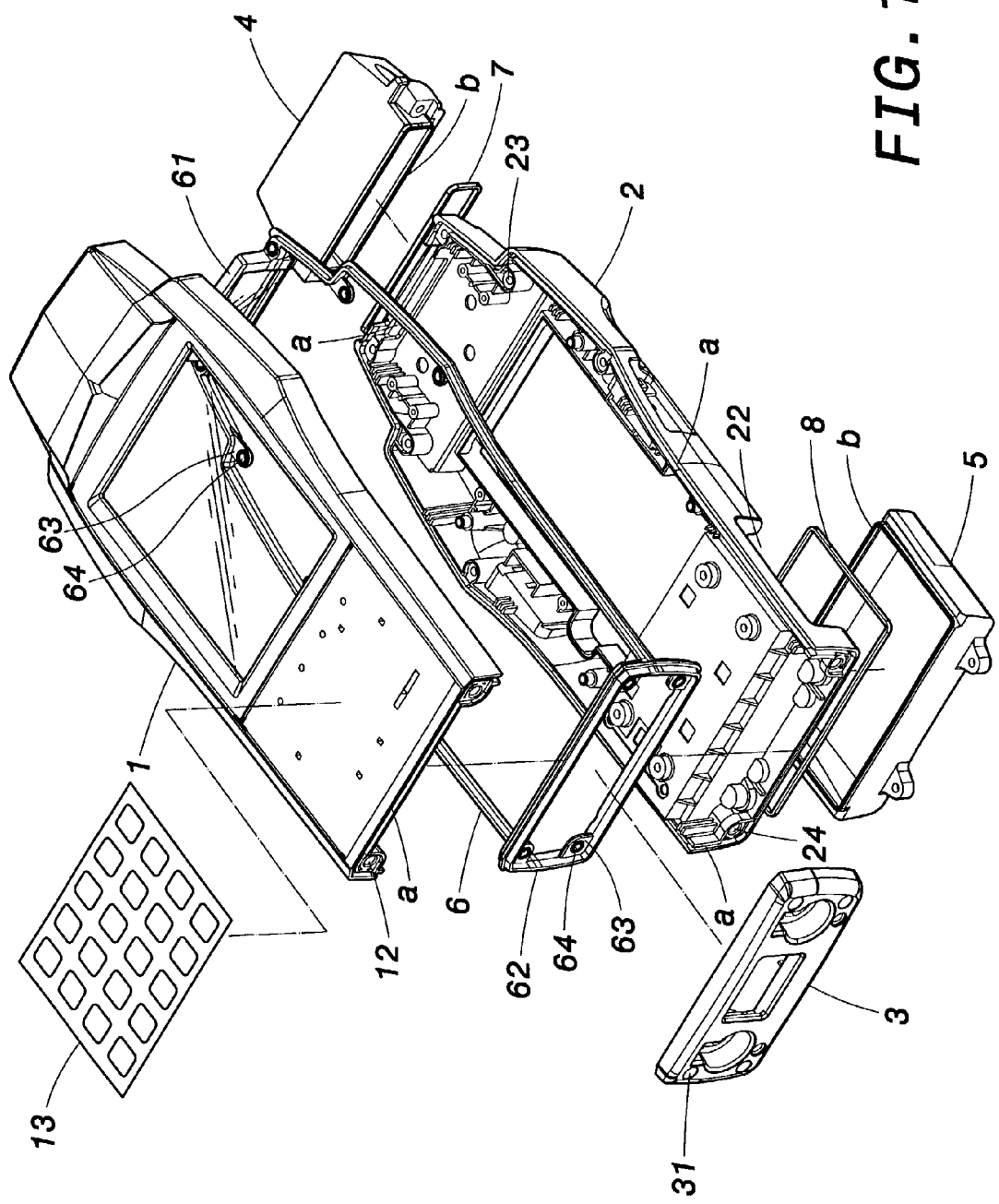
FIG. 1 is an exploded perspective front view of the present invention.

As shown in FIGS. 1 to 4, the present invention provides a waterproof structure of a handheld electronic device. The handheld electronic device comprises a housing and internal components (not shown) disposed in the housing. The housing comprises a front shell 1, a rear shell 2, a bottom cover 3, a cover body 4, and a battery cover 5.

Grooves a opposed to each other are disposed at adjoining positions of the front and rear shells 1 and 2. Grooves a opposed to each other are also disposed at topsides of the front and rear shells 1 and 2. A groove a is disposed at the bottom side of each of the front and rear shells 1 and 2 so that a main body gasket 6 can be embedded between the front and rear shells 1 and 2.

The shape of the vertical type main body gasket 6 depends on the adjoining profile between the front and rear shells 1 and 2. The top and bottom ends of the main body gasket 6 are connected to a horizontal type top gasket 61 and a horizontal type bottom cover gasket 62, respectively. The main body gasket 6 can thus be embedded at the adjoining profile between the front and rear shells 1 and 2. The top gasket 61 and the bottom cover gasket 62 at the top and bottom end of the main body gasket 6 are embedded in the opposed grooves a between the front and rear shells 1 and 2 and in the two grooves a at the bottom sides of the front and rear shells 1 and 2, respectively.

An annular groove a (shown in FIG. 4) is disposed between the bottom cover 3 and the bottom side of the housing. This groove a corresponds to the combination of the grooves a at the bottom sides of the front and rear shell 1 and 2 so that the bottom cover gasket 6 can be embedded between the bottom side of the housing and the bottom cover 3.

Figure 2:
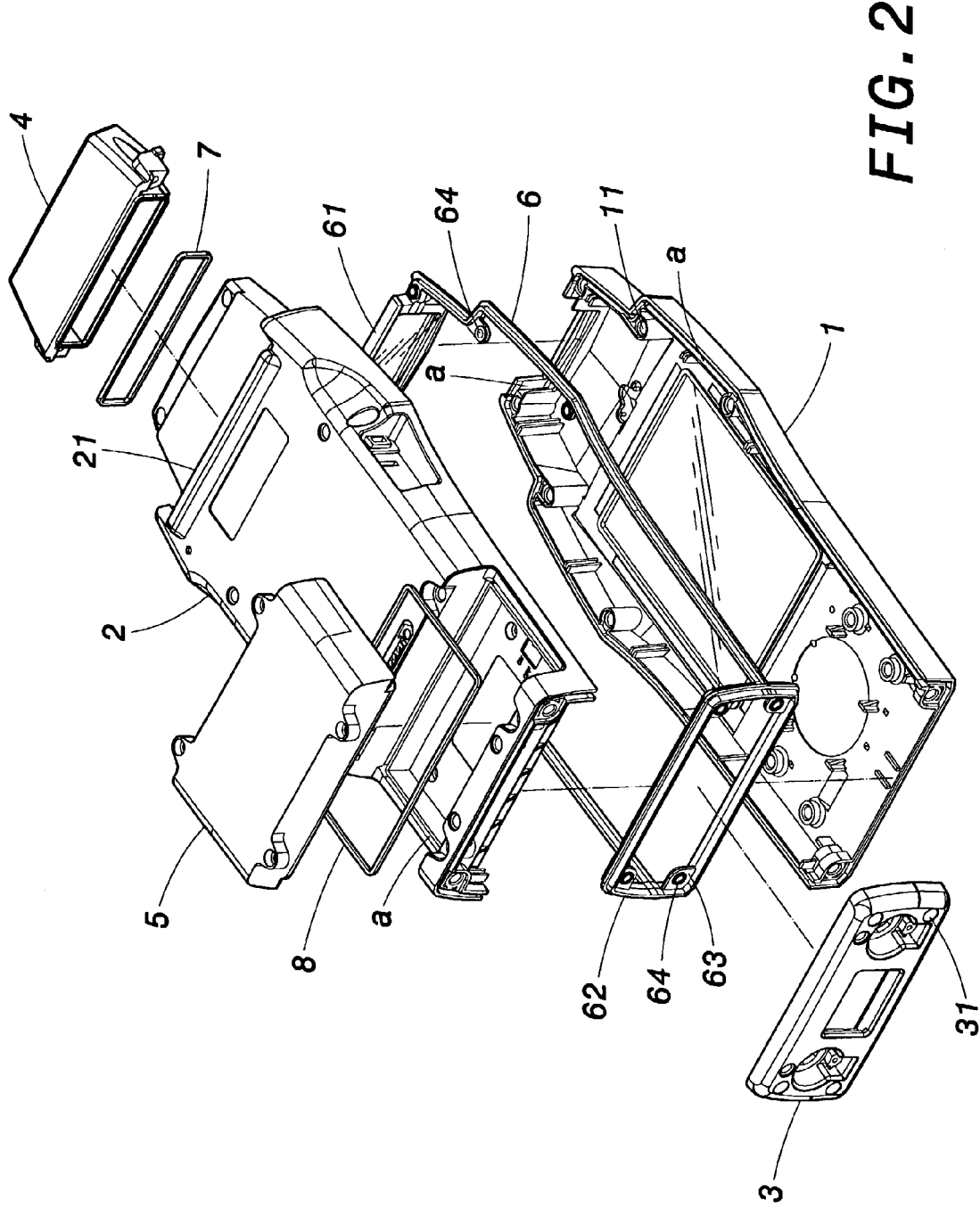
FIG. 2 is an exploded perspective inverted view of the present invention.
Figure 3:
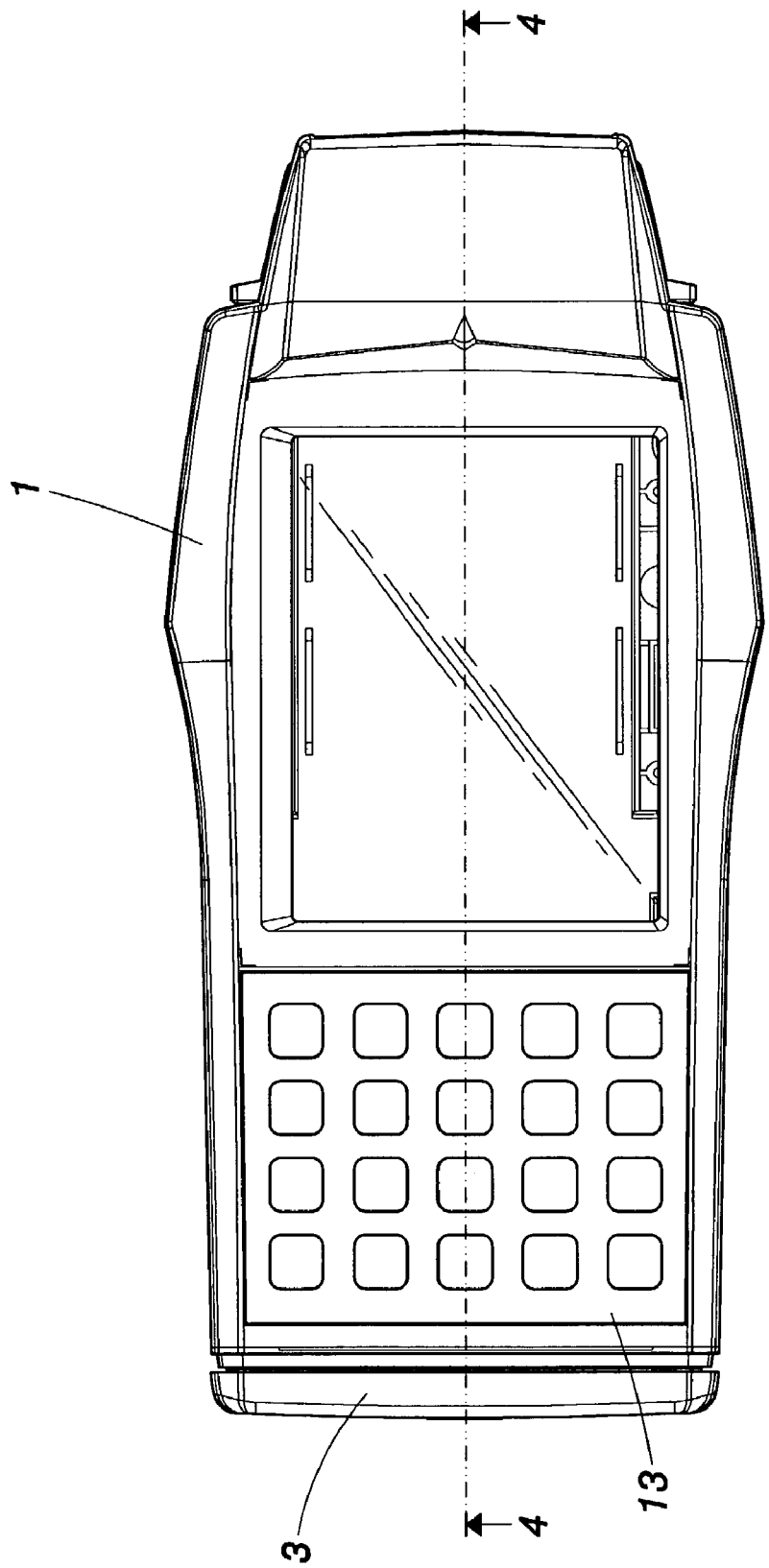
FIG. 3 is a front view of the present invention after assembly.
Figure 4:
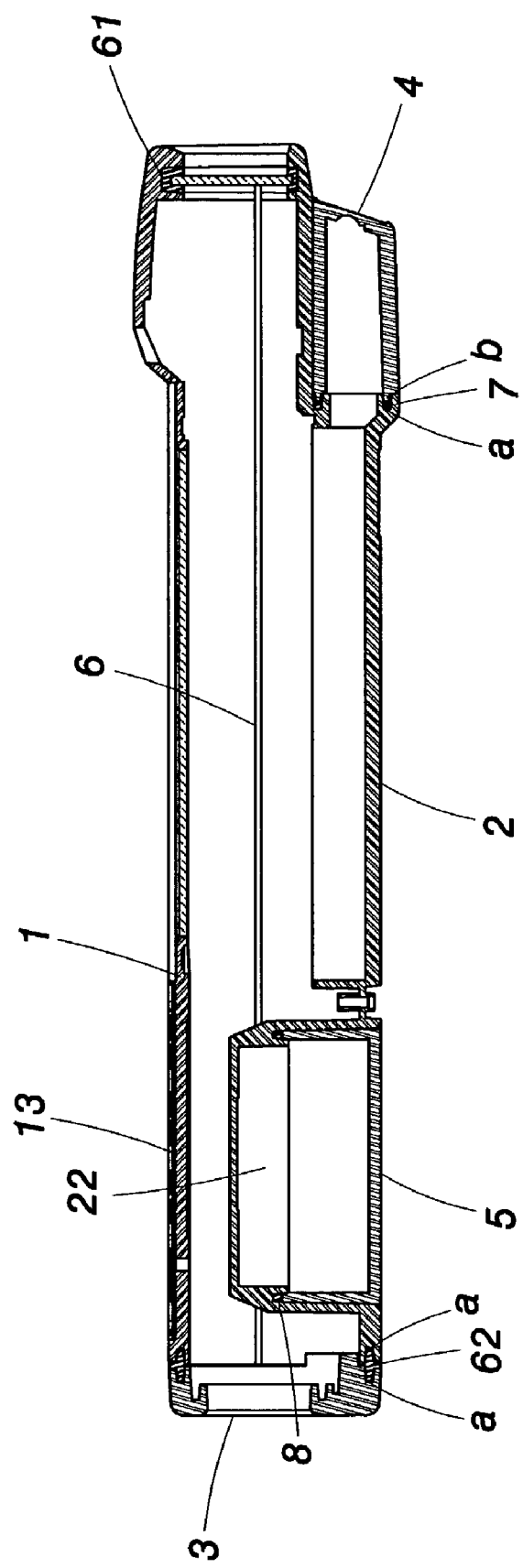
FIG. 4 is a cross-sectional view of the present invention along line 4—4 in FIG. 3.

A bearing portion 21 (shown in FIGS. 2 and 4) is formed above the backside of the rear shell 2 in stepped drop way. A battery receiving room 22 is disposed below the backside of the rear shell 2. As shown in FIG. 4, an annular groove a is disposed at the top edge of the bearing portion 21. The bearing portion 21 corresponds to a cover body 4 having an annular flange b corresponding to the annular groove a at the bottom edge thereof. An annular cover body gasket 7 is embedded between the bearing portion 21 and the cover body 4. As shown in FIGS. 2 and 4, an annular groove a is disposed at the adjoining position between the battery receiving room 22 and the battery cover 5. An annular flange b shown in FIG. 1 is disposed at the corresponding position of the battery cover 5 so that a battery cover gasket 8 can be embedded between the battery cover 5 and the battery receiving room 22.

The bearing portion 21 is used for insertion of a card. Because of frequent opening and closing, the bearing portion 21 needs to undergo waterproof processing. In the present invention, an annular groove a is disposed at the top edge of the bearing portion 21. The baring portion 21 corresponds to the cover body 4 having an annular flange b corresponding to the groove a at the bottom edge thereof. An annular cover body gasket 7 is embedded between the bearing portion 21 and the cover body 4. Therefore, complete isolation with the exterior can be accomplished, and there will be absolute no permeation of water or moisture.

A plurality of projective ears 63 are disposed at the inner edge of the main body gasket 6. The projective ears 63 have through holes 64 corresponding to positioning post holes 11 and 23 of the front and rear shells 1 and 2. A plurality of projective ears 63 having through holes. 64 are also disposed at the inner edge of the bottom cover gasket 62 of the main body gasket 6. The through holes 64 of the bottom cover gasket 62 correspond to bottom hole bodies 12 and 24 of the front and rear shells 1 and 2 and bottom cover hole bodies 31 of the bottom cover 3. The main body gasket 6 can thus be firmly positioned between the front and rear shells 1 and 2. The bottom cover gasket 62 of the main body gasket 6 can also be firmly positioned between the bottom side of the housing and the bottom cover 3.

The above projective ears 63 and other projective ears of the same type without numerals have the effect of preventing screw holes (e.g., the bottom hole bodies 12 and 24) from permeation of water or moisture, hence accomplishing a complete waterproof effect. Besides, as shown in FIG. 1, a thin film key 13 can be disposed at one face of the front shell 1.

To sum up, because each connection position of the housing of the handheld electronic device has a corresponding gasket for preventing permeation of water or moisture, the waterproof effect can be accomplished. Moreover, because the top and bottom ends of the vertical type main body gasket 6 are connected to the horizontal type top gasket 61 and the horizontal type bottom cover gasket 62, better simplicity and convenience can be accomplished when assembling the main body gasket 6. Additionally, the projective ears 63 having the through holes 64 are disposed at the main body gasket 6 and the bottom cover gasket 62, and the through holes 64 correspond to the positioning post hole bodies 11 and 23 and the bottom hole bodies 12 and 24 of the front and rear shells 1 and 2 and the bottom cover hole bodies 31, hence having firmly positioning effect and the function of preventing screw holes (e.g., the bottom hole bodies 12 and 24) from permeation of water or moisture.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A waterproof structure of a handheld electronic device, a housing of said electronic device comprising a front shell, a rear shell, a bottom cover, a cover body, and a battery cover, a bearing portion and a battery receiving room being disposed above and below a backside of said rear shell, respectively, said waterproof structure comprising:
    a main body gasket with a shape conformable with an adjoining profile between said front and rear shells, a top end and a bottom end of said main body gasket being connected to a top gasket and a bottom cover gasket, respectively, said main body gasket and said top gasket being embedded between adjoining positions and topsides of said front and rear shells, respectively, said bottom cover gasket being embedded between a bottom side of said housing and said bottom cover;
    a cover body gasket embedded between said cover body and said bearing portion of said rear shell; and
    a battery cover gasket embedded between said battery receiving room and said battery cover;
    whereby said housing of said electronic device has the waterproof effect through the help of said main body gasket, said top gasket, said bottom cover gasket, said cover body gasket, and said battery cover gasket.

2. The waterproof structure of a handheld electronic device as claimed in claim 1, wherein grooves opposed to each other are disposed at the adjoining positions of said front and rear shells, grooves opposed to each other are also disposed at the topsides of said front and rear shells, grooves are also disposed at bottom sides of said front and rear shells, and said grooves are used for embedding of said main body gasket and said top gasket and said bottom cover gasket of said main body gasket.

3. The waterproof structure of a handheld electronic device as claimed in claim 2, wherein a groove is disposed at an adjoining position of said bottom cover and the bottom side of said housing, and said groove corresponds to the combination of said grooves at the bottom sides of said front and rear shells.

4. The waterproof structure of a handheld electronic device as claimed in claim 1, wherein a groove is disposed at a top edge of said bearing portion of said rear shell, a flange is disposed at a bottom edge of said cover body, and said cover body gasket is embedded between said groove and said flange.

5. The waterproof structure of a handheld electronic device as claimed in claim 1, wherein a groove is disposed at a rear edge of said battery receiving room of said rear shell, a flange is disposed at a position adjoining said battery cover, and said battery cover gasket is embedded between said groove and said flange.

6. The waterproof structure of a handheld electronic device as claimed in claim 1, wherein a plurality of projective ears are further disposed at said main body gasket, said projective ears have through holes, and said through holes correspond to positioning post hole bodies between said front and rear shells.

7. The waterproof structure of a handheld electronic device as claimed in claim 6, wherein a plurality of projective ears are further disposed at said bottom cover gasket of said main body gasket, said projective ears have through holes, and said through holes correspond to bottom hole bodies at the bottom side of said front and rear shells and bottom cover hole bodies of said bottom cover.

8. The waterproof structure of a handheld electronic device as claimed in claim 1, wherein said main body gasket is of vertical type, and a top end and a bottom end of said main body gasket are connected to a horizontal type top gasket and a horizontal type bottom cover gasket, respectively.

* * * * *